Dec. 2, 1941.　　　L. E. WHITTAKER　　　2,264,350
CINEMATOGRAPHIC FILM-FEEDING APPARATUS
Filed Oct. 18, 1939　　　5 Sheets-Sheet 1

Inventor:
Lloyed F. Whittaker
By Roberts, Cushman & Woodbury
his Attys.

Dec. 2, 1941.   L. E. WHITTAKER   2,264,350
CINEMATOGRAPHIC FILM-FEEDING APPARATUS
Filed Oct. 18, 1939   5 Sheets-Sheet 3

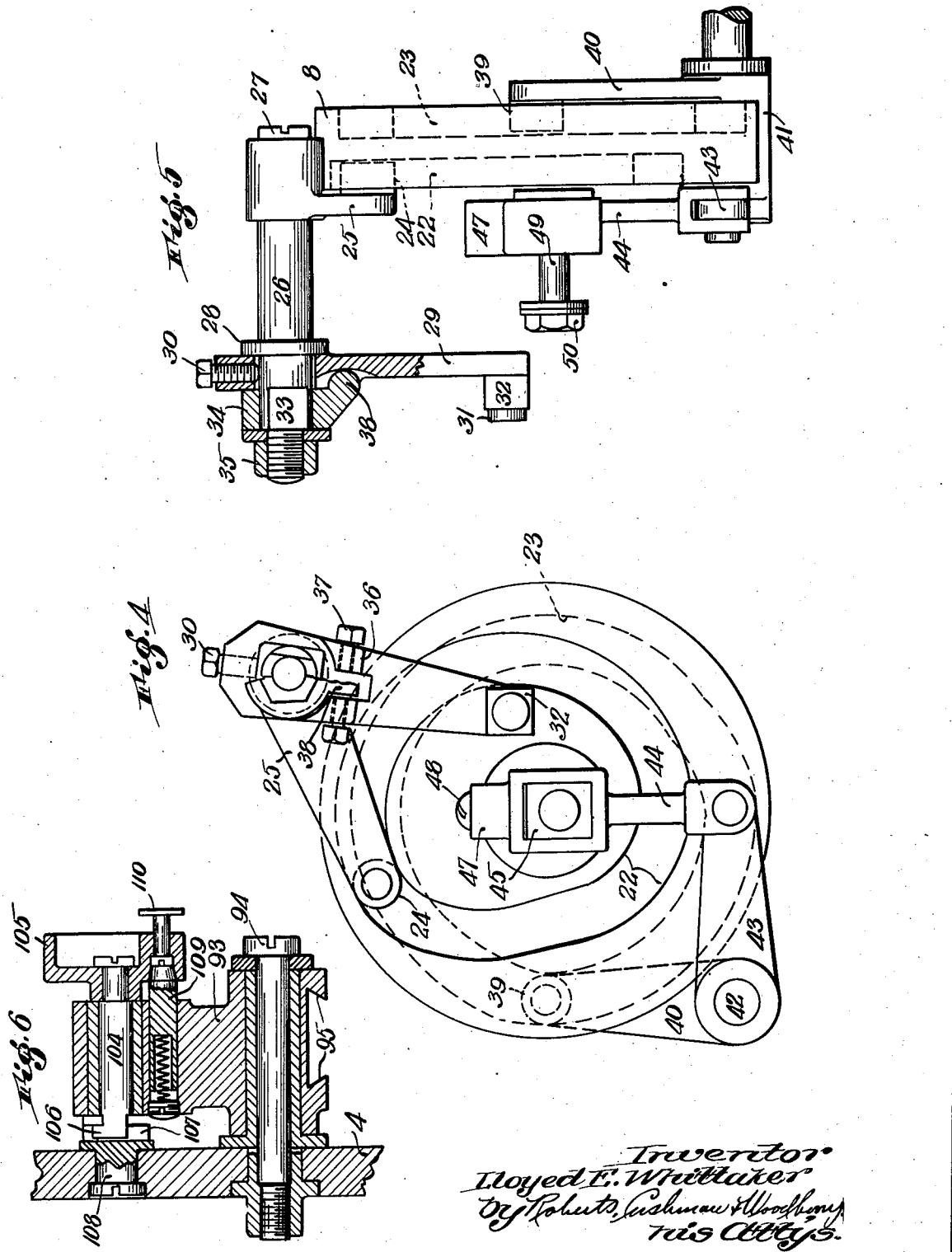

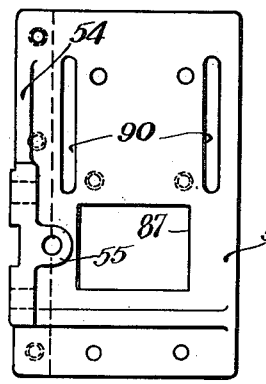
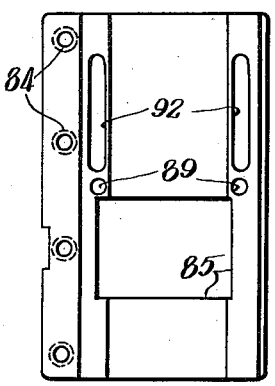
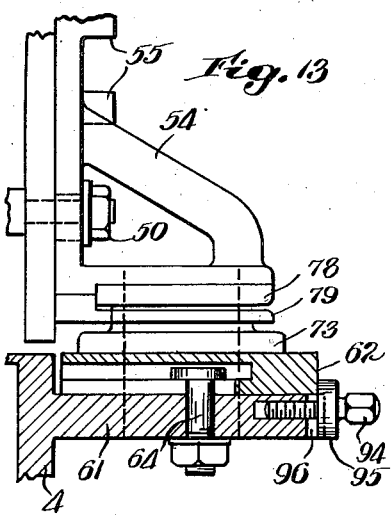
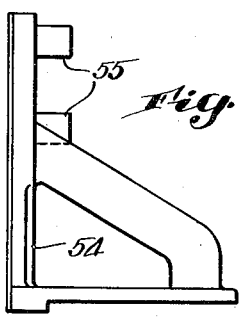
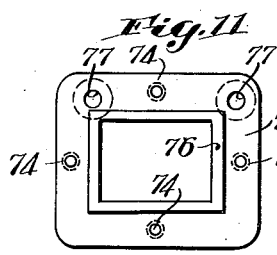
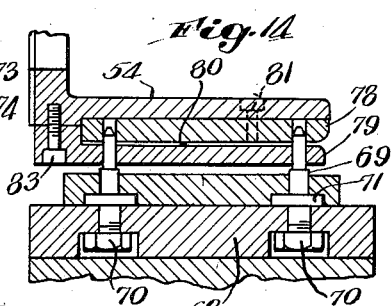
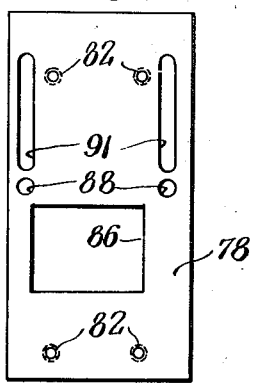
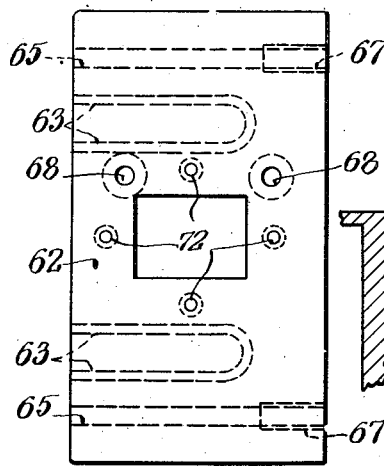
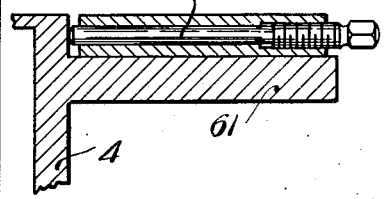

Patented Dec. 2, 1941

2,264,350

UNITED STATES PATENT OFFICE 2,264,350

CINEMATOGRAPHIC FILM-FEEDING APPARATUS

Lloyed E. Whittaker, Los Angeles, Calif., assignor to Technicolor Motion Picture Corporation, Los Angeles, Calif., a corporation of Maine Application October 18, 1939, Serial No. 299,997

5 Claims. (Cl. 88—18.4)

This invention relates to motion picture machines in which the film is fed intermittently by teeth engaging in the sprocket holes of the film, particularly projection printers in which a picture is projected, either with or without enlargement or reduction, from a picture film to a film to be printed.

Objects of the present invention are to provide apparatus of the character referred to which is accurate and reliable in operation, which moves the film on and off the film-feeding teeth smoothly and without tendency to damage the film, which is precisely adjustable to shift the frame of the projected picture lengthwise or crosswise of the film or angularly in a plane parallel to the film, and which is precisely adjustable to any film irrespective of the extent of shrinkage.

For the purpose of illustration a typical embodiment of the invention is shown in the accompanying drawings in which—

Fig. 4 is a front elevation of a cam wheel and associated parts;

Fig. 5 is a view from the right-hand side of Fig. 4, parts being shown in section;

Fig. 6 is a section on line 6—6 of Fig. 1;

Fig. 7 is a top plan view of the register-leaf carriage;

Fig. 8 is an end elevation of the register-leaf carriage;

Fig. 9 is a bottom plan view of the top register leaf;

Fig. 10 is a top plan of the lower register leaf;

Fig. 11 is a top plan of the aperture plate;

Fig. 12 is a top plan of the register plate; and

Figure 1:
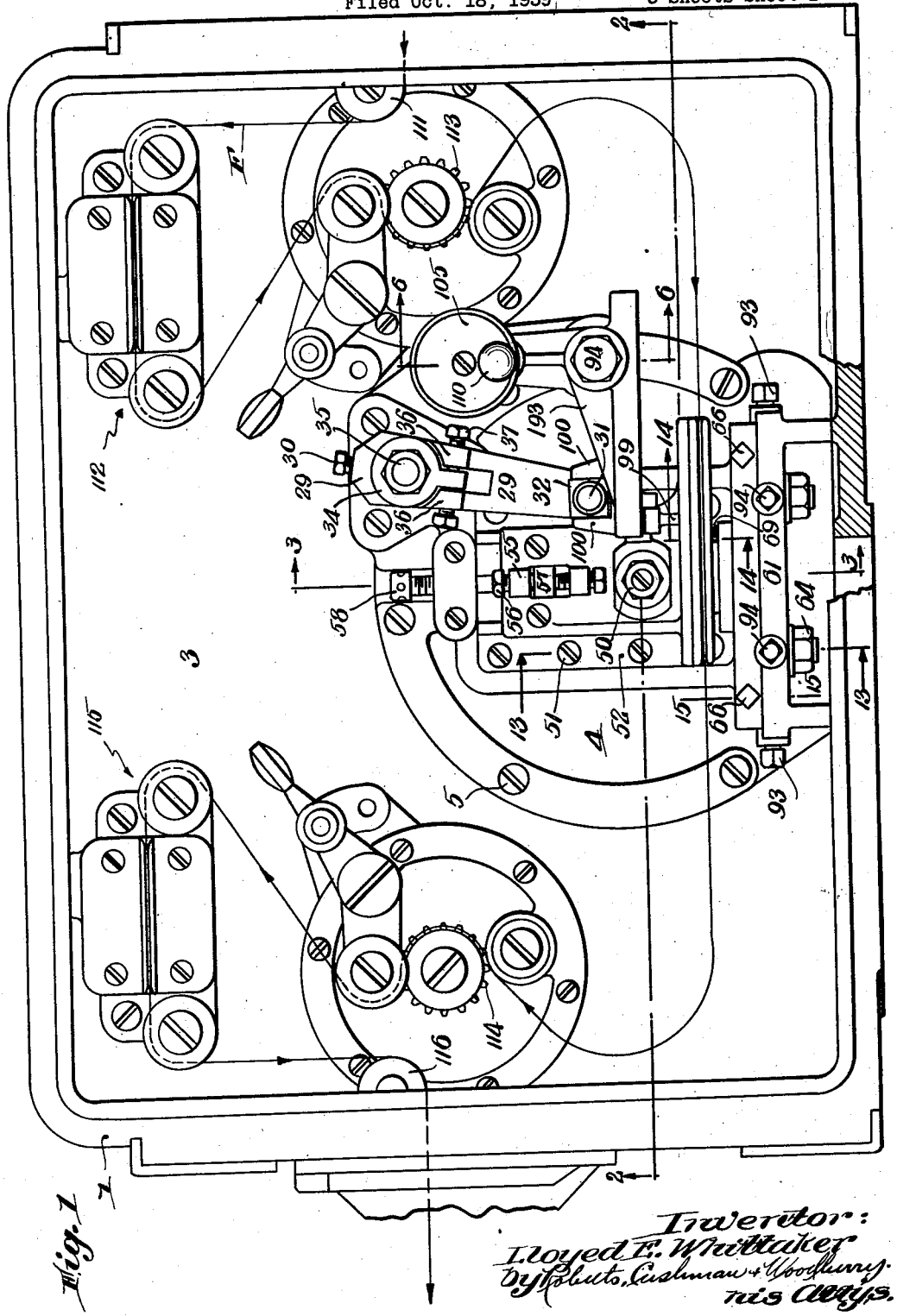
Fig. 1 is a front elevation with the cover removed.

Figs. 13, 14 and 15 are sections on lines 13—13, 14—14 and 15—15 of Fig. 1.

The particular embodiment of the invention chosen for the purpose of illustration comprises a front casing 1 and a rear casing 2 (Fig. 2) secured together by screws not shown, the front casing having a rear wall 3 provided with an opening in which a movement mounting 4 is secured by means of screws 5 (Fig. 1). The rear casing 2 has a forwardly projecting flange 6 (Fig. 2) which meets the wall 3 around the aforesaid opening to form a separate compartment 7 for the cam wheel 8. The front casing 1 is provided with a cover 9 and the rear casing 2 is provided with gibs 10 to slide back and forth on the support 11. Integral with the rear casing 2 are circular bearing supports 13 and 14 for the two shafts 15 and 16 which carry intermeshing gears 17 and 18, the shafts being mounted in the tubular portions 13 and 14 by means of roller bearings 19 and 20. The shaft 15 carries a second gear 17' for driving the cam wheel 8.

Figure 2:
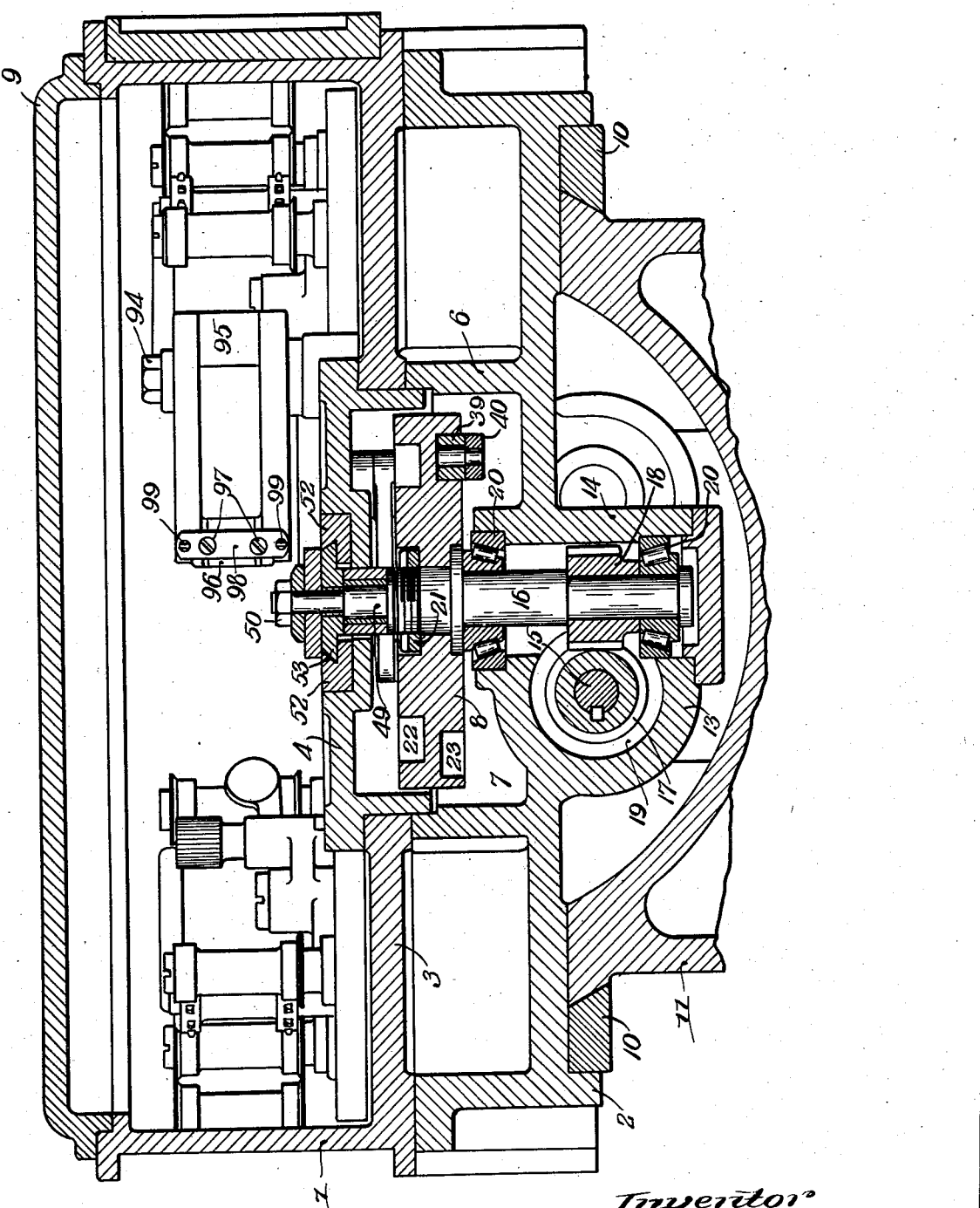
Fig. 2 is a section on line 2—2 of Fig. 1.

As shown in Fig. 2 the cam wheel 8 is mounted on the shaft 16 by means of a nut 21, and the wheel has front and rear cam grooves 22 and 23. Riding in the front groove 22 is the cam roller 24 (Fig. 4) mounted on the end of an arm 25 secured to the shaft 26 by means of a screw 27, the shaft 26 being journaled in and extending through the movement mounting 4. Fitting over the forward end of the shaft 26 against an integral flange 28 is a rocker arm 29 which may be shifted lengthwise by screw 30 (Figs. 1, 4 and 5) to vary the effective length of the arm. On the lower end of the arm 29 is a forwardly projecting pin 31 upon which is rotatably mounted a block 32 whose outer contour is rectangular in cross-section. Immediately in front of the arm 29 the shaft 26 is provided with flat faces 33 and fitting over this portion of the shaft is a collar 34 which also has flat faces fitting against the faces 33 so that the collar can not rotate relatively to the shaft, the collar being held in position by a nut 35 threaded on the end of the shaft. Projecting forwardly from the arm 29 are two spaced lugs 36 carrying set screws 37 (Figs. 1 and 4), and extending downwardly from the collar 34 between the lugs 36 is a lug 38 against the opposite faces of which the set screws 37 abut. By adjusting the screws 37 the angular position of the arm 29 relatively to the shaft 26 may be adjusted, the nut 35 then being tightened to hold the arm in adjusted position.

Figure 3:
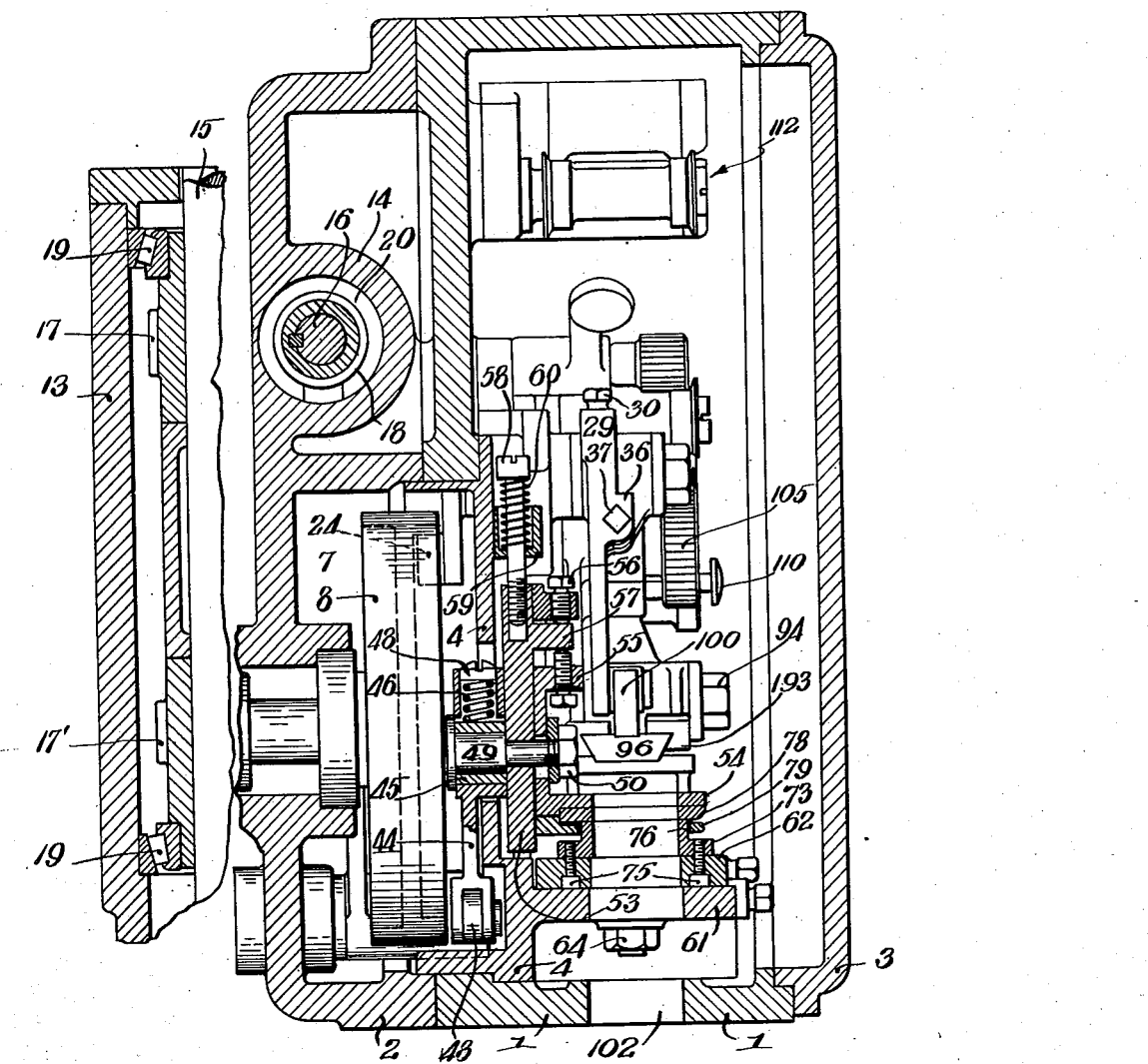
Fig. 3 is a section on line 3—3 of Fig. 1.

Riding in the rear groove 23 of the cam 8 is a roller 39 mounted on the arm 40 of a bell crank 41 which is journaled on the shaft 42. The other arm 43 of the bell crank is pivotally connected to an oscillating link 44 which terminates at its upper end in a rectangular portion having a rectangular opening to receive the block 45. As shown in Fig. 3 the block 45 is yieldingly pressed downwardly in the rectangular opening by means of a spring 46 disposed in the upward extension 47 and held in position by a screw 48, the spring yielding to permit a film splice to pass through the machine. Journaled in the block 45 is a shaft 49 the forward end of which is reduced and carries a nut 50.

Mounted in a recess in the forward side of the movement mounting 4, by means of screws 51, are vertically disposed gibs 52 in which the dovetail plate 53 may slide up and down (Figs. 1 and 2). Seated against the forward side of the plate 53 is an L-shaped register-leaf carriage 54, the plate and carriage having openings to receive the reduced forward portion of the bolt 49 and being clamped against the shoulder of the bolt by means of the aforesaid nut 50. Near its upper end the L-shaped register-leaf carriage has two forwardly projecting lugs 55 carrying opposed set screws 56 which bear against the upper and lower sides of a lug 57 projecting forwardly from the plate 53 through an opening in the register-leaf carriage (Figs. 1 and 3). By adjustment of the screws 56 the register-leaf carriage may be raised or lowered relatively to the plate 53 after which the nut 50 is tightened to hold the parts firmly in adjusted position. Threaded into the top of the dovetail plate 53 is a screw 58 which extends through an opening in the cup-shaped member 59 mounted on the forward face of the movement mounting 4. A compression spring 60 between the bottom of the cup and the head of the screw serves to counterbalance the weight of the plate 53, the register-leaf carriage 54 and the vertically reciprocating parts carried thereby.

As shown in Fig. 3 the movement mounting 4 has a horizontal forwardly projecting flange or platform 61 upon the upper face of which is mounted a register plate 62 which has T-shaped grooves 63 (Fig. 12) to receive the head of bolt 64. Extending from front to rear through the plate 62 are openings 65 to receive the adjusting screws 66 which are threaded into the openings from the front at 67 and which project through the plate to bear against the movement mounting 4 (Fig. 15). Mounted in openings 68 (Fig. 12) in the register plate are pilot or register pins 69 which are held in place by nuts 70 (Fig. 14), the pins having integral flanges 71 seating against the upper surface of the register plate. Mounted on the top of the register plate, by means of screws extending upwardly through openings 72 in the register plate, is an aperture plate 73 which has threaded holes 74 to receive the aforesaid screws 75 (Figs. 11 and 14). The plates 62 and 73 have aligned rectangular apertures and the aperture plate 73 has an upstanding flange 76 surrounding its aperture. As shown in Fig. 11 the aperture plate has openings 77 to accommodate the register pins 69.

Mounted on the bottom of the L-shaped register-leaf carriage 54 are upper and lower register leaves 78 and 79, the leaves being spaced apart just enough to permit the free passage of a film through the space 80 therebetween (Fig. 14). The upper register leaf is secured to the carriage 54 by means of screws 81 extending downwardly through openings in the carriage and threading into openings 82 in the register leaf (Figs. 9 and 14). The lower register leaf is secured to the carriage by means of screws 83 extending upwardly through openings 84 (Fig. 10) and thence threading into the carriage. The lower register leaf has a rectangular aperture 85 large enough to receive the upstanding flange 76 of the aperture plate 73 (Fig. 3). The upper register leaf 78 and the carriage 54 have apertures 86 and 87 which register with the aperture in the aperture plate 73. Thus when the register-leaf carriage 54 moves downwardly to the position shown in Fig. 3 the film is clamped between the upper register leaf and the upstanding flange 76 of the aperture plate 73 on each of the four sides of the picture area. As shown in Figs. 9 and 10 the upper and lower register leaves have openings 88 and 89 to receive the reduced upper ends of the register pins 69 (Fig. 14); and as shown in Figs. 7, 9 and 10 the register-leaf carriage 54 and the top register leaf 78 and the bottom register leaf 79 have slots 90, 91 and 92 respectively to receive the film-feeding pins.

As shown in Figs. 1, 3 and 13 the forwardly projecting portion 61 of the movement mounting 4 carries four adjusting screws including two end screws 93 and two side screws 94. As shown in Fig. 13 each of these screws is threaded into the platform 61 and each has an integral flange 95 fitting into a concentric circular recess 96 in the platform, the flanges 95 overlapping the aperture plate 62 so as to exert pressure on the plate when the screws are threaded inwardly. By advancing one screw 93 and retracting the other end screw 93 the aperture plate may be adjusted endwise. By retracting screws 66 and advancing screws 94 the aperture plate may be adjusted to the rear (to the left of Figs. 13 and 15); by retracting the screws 94 and advancing the screws 66 the register plate may be adjusted forwardly; and by adjusting the screws 66 in opposite directions, with corresponding adjustment of the screws 94, the aperture plate may be adjusted angularly. Thus the plate may be adjusted either endwise or crosswise or angularly. After the plate has been adjusted to the proper position the bolts 64 are tightened to hold it in position.

The mechanism for intermittently advancing the film between successive exposures comprises a dovetail guide 193 pivotally mounted on the plate 4 by means of a bolt 94 and having a dovetailed guideway 95 on its lower side (Figs. 2 and 6) to receive a reciprocating carriage 96 to the lower side of which is secured by means of screws 97 (Fig. 2) a cross head 98 which carries the depending film-feeding pins 99. Projecting upwardly from the carriage 96 are two jaws 100 which straddle the aforesaid block 32 on pin 31 (Fig. 1). Thus as the arm 29 is rocked back and forth the film-feeding carriage 96 reciprocates back and forth in the dovetailed guideway 193. The grooves in the cam wheel 8 are so shaped in relation to each other that after the film-feeding mechanism has advanced the film one step the register-leaf carriage 54 moves downwardly to shift the film from the film-feeding pins 99 to the register pins 69. After the film has been exposed the register-leaf carriage again rises to shift the film from the register pins 69 back to the feeding pins 99. Each time the film stops it is pressed down against the flange 76 of the aperture plate 73, and while thus held on each of the four sides of the picture space the film is exposed through the aforesaid apertures and the opening 102 in the bottom of the casing 1.

Inasmuch as the film-feeding pins project downwardly somewhat below the level of the upper ends of the register pins and inasmuch as neither pair of pins retracts in the normal operation of the machine, the register pins being stationary and the feeding pins merely reciprocating back and forth in a straight line, it is necessary to provide means for retracting one pair of pins while the machine is being threaded. For this purpose the guideway 193 for the feeding-pin carriage is rotated about the bolt 94 in a clockwise direction (Fig. 1) until the lower ends of the feeding pins are raised above the level of the upper ends of the register pins, there being enough clearance between the lower side of the block 32 and the feeding-pin carriage to permit them angular movement (Fig. 1). As shown in Fig. 6 the mechanism for effecting this angular movement comprises a shaft 104 extending through the upper end of the L-shaped member 193 with a handle 105 on the forward end of the shaft and an eccentric 106 on the rear end of the shaft, the eccentric fitting in a vertical slot 107 in a member 108 mounted in the plate 4. To hold the handle 105 in normal position a spring-pressed detent 109 is arranged to seat in a recess in the rear side of the handle, a plunger 110 being provided to push the detent out of the recess. Thus to rotate the L-shaped member 193 about the shaft 94 the plunger 110 is pushed inwardly until the detent 109 clears the handle 105, whereupon rotation of the handle causes the eccentric 106 to rotate the part 193. To restore the parts to normal position it is necessary merely to rotate the handle backwardly to the position shown in Fig. 6 whereupon the detent 109 snaps into the recess in the handle.

Referring to Fig. 1 the film F feeds into the apparatus through a slot in the casing thence over a guide roller 111 thence through a vacuum cleaner 112 thence over a continuously driven sprocket wheel 113 thence through the space 80 between the register leaves (Fig. 14) thence over another continuously driven sprocket wheel 114 thence through another vacuum cleaner 115 thence over a roller 116 and out through another slot in the casing.

From the foregoing it will be evident that, in normal operation, the film-feeding pins reciprocate back and forth without any component of movement crosswise of the film path. It will also be evident that the means for shifting the film back and forth between feed pins and register pins also has purely reciprocatory motion parallel to the axes of the pins. Consequently there is very little wear on the edges of the film sprocket holes and no tendency to damage the film in shifting it from one set of pins to the other. The effective length of the arm 29 may be accurately adjusted by the screw 30, thereby to vary the length of the stroke of the feed pins 99; and the limits of the stroke may be advanced or retracted by the adjusting screws 37. The upper and lower limits of the stroke of the film-shifting register leaves may be raised or lowered by means of the screws 56, thereby accurately to regulate the extent to which the feed pins and register pins project into the sprocket holes of the film. To thread the film between the two sets of pins it is necessary merely to push in on the plunger 110 and rotate the wheel 105 in a counter-clockwise direction (Fig. 1). Normally the spring 46 holds the block 45 seated against the bottom of the opening in link 44 (Figs. 3 and 4) but when the film is clamped between the flange 76 of the aperture plate 73 and the upper register leaf 78 (Fig. 3) the spring may give more or less depending upon the thickness of the film. For example, with a film splice clamped between 76 and 78 the block 45 may stock substantially before the link 44 reaches the bottom of its stroke.

While the space 80 (Fig. 14) may have a vertical dimension great enough to accommodate more than one film, for use in contact printing for example, this dimension need be only sufficient to accommodate the film to be printed in the case of a projection printer. In either case the light enters through the opening 102 (Fig. 3).

It should be understood that the present disclosure is for the purpose of illustration only and that this invention includes all modifications and equivalents which fall within the scope of the appended claims.

I claim:

1. Cinematographic apparatus comprising guide means for guiding film along a rectilinear path, feed means having reciprocatory movement lengthwise of said path for advancing the film step by step, said feed means having teeth interengageable with sprocket holes in the film, means for moving said teeth away from said path for threading purposes, and reciprocatory means for shifting said guide means in a direction perpendicular to said path, thereby to move the film on and off said teeth in a direction parallel to the axes of the teeth.

2. Cinematographic apparatus comprising guide means for guiding film along a rectilinear path, feed means having a guideway parallel to said path and a film feeder reciprocating in the guideway for advancing the film step by step, said feeder having teeth interengageable with sprocket holes in the film, a swinging arm having a sliding connection with said feeder for actuating the feeder, means utilizing said sliding connection for moving said teeth away from said path for threading purposes, and means for shifting said guide means transversely of said path, thereby to move the film on and off said teeth.

3. Cinematographic apparatus comprising guide means for guiding film along a rectilinear path, feed means having a guideway parallel to said path and a film feeder reciprocating in the guideway for advancing the film step by step, said feeder having teeth interengageable with sprocket holes in the film, an oscillatory arm for actuating said feeder, and reciprocatory means for shifting said guide means in a direction perpendicular to said path, thereby to move the film on and off said teeth in a direction parallel to the axes of the teeth.

4. Cinematographic apparatus comprising guide means for guiding film along a rectilinear path, feed means having a guideway paralel to said path and a film feeder reciprocating in the guideway for advancing the film step by step, said feeder having teeth interengageable with sprocket holes in the film, a swinging arm for actuating said feeder, a shaft for swinging said arm, micrometer means for adjusting said arm on said shaft, and means for shifting said guide means transversely of said path, thereby to move the film on and off said teeth.

5. Cinematographic apparatus comprising guide means for guiding film along a rectilinear path, feed means having a guideway parallel to said path and a film feeder reciprocating in the guideway for advancing the film step by step, said feeder having teeth interengageable with sprocket holes in the film, a swinging arm having a sliding connection with said feeder for actuating the feeder, and means for shifting said guide means transversely of said path, thereby to move the film on and off said teeth.

LLOYED E. WHITTAKER.